United States Patent [19]
Takita et al.

[11] Patent Number: 5,543,450
[45] Date of Patent: Aug. 6, 1996

[54] NONFLAMMABLE SILICONE RUBBER COMPOSITIONS

[75] Inventors: Kenichi Takita; Masaharu Takahashi, both of Gunma-ken, Japan

[73] Assignee: Shin-Etsu Chemical Co., Ltd., Tokyo, Japan

[21] Appl. No.: 534,167

[22] Filed: Sep. 26, 1995

[30] Foreign Application Priority Data

Sep. 27, 1994 [JP] Japan ................................. 6-257389

[51] Int. Cl.$^6$ ....................................................... C08K 5/23
[52] U.S. Cl. ......................... 524/190; 524/403; 524/413; 524/434; 524/493; 528/21
[58] Field of Search ................................... 524/190, 434, 524/403, 413, 493; 528/21

[56] References Cited

U.S. PATENT DOCUMENTS

| | | |
|---|---|---|
| 3,035,874 | 5/1962 | Ferris et al. . |
| 3,652,488 | 3/1972 | Harder et al. . |
| 3,862,081 | 1/1975 | Itoh et al. . |
| 4,087,399 | 5/1978 | Hamada et al. . |
| 4,110,300 | 8/1978 | Matsushita . |
| 4,310,444 | 1/1982 | Hamada et al. . |
| 4,320,044 | 3/1982 | Nakamura ................................. 524/190 |
| 5,225,236 | 7/1993 | Keusch et al. ............................. 428/77 |

FOREIGN PATENT DOCUMENTS 846246  7/1970  Canada .

Primary Examiner—Melvyn I. Marquis
Attorney, Agent, or Firm—Millen, White, Zelano, & Branigan, P.C.

[57] ABSTRACT

The present invention provides nonflammable silicone rubber compositions which exhibit a superior noninflammability and a reduced toxicity due to by-products generated during vulcanization and forming processes.

16 Claims, No Drawings

NONFLAMMABLE SILICONE RUBBER COMPOSITIONS

BACKGROUND OF THE INVENTION

The present invention relates to nonflammable silicone rubber compositions. Specifically, this invention relates to nonflammable silicone rubber compositions which exhibit a superior nonflammability and a reduced toxicity due to by-products generated during the vulcanization and forming process.

For making silicone rubbers nonflammable, platinum containing compounds have been proposed (Japanese patent application, Kokoku (examined) 44-2591, equivalent to CA 846,246-A). In addition to platinum, various compounds were proposed for further increased nonflammability: platinum containing compounds along with carbon black (Japanese patent application, Kokoku 47-16546, equivalent to U.S. Pat. No. 3,652,488); platinum containing compounds along with fumed titanium oxide (Japanese patent application, Kokoku 47-21826, equivalent to U.S. Pat. No. 3,035,874); platinum containing compounds along with azo compounds (Japanese patent application, Kokoku 51-24302, equivalent to U.S. Pat. No. 3,862,081); platinum containing compounds along with iron oxide (Japanese patent application, Kokoku 51-35501 and Kokoku 53-44501, equivalent to U.S. Pat. No. 4,110,300); platinum containing compounds along with triazole type compounds (Japanese patent application, Kokoku 53-16019, equivalent to U.S. Pat. No. 4,087,399 and Kokoku 62-61613, equivalent to U.S. Pat. No. 4,310,444); and platinum containing compounds along with organic silicone compounds having nitrogen containing organic groups and unsaturated groups (Japanese patent application, Kokoku 3-39550).

A high level of nonflammability, such as the V-0 or V-1 levels defined in UL-94 (Underwriters Laboratories), is achieved by the combined use of platinum containing compounds along with azo compounds, triazole compounds, and nitrogen containing organic silicone compounds. However, the usage of the azo compounds in combination has led to a wide variety in the levels of the resultant nonflammability, depending upon the structure of the azo compound. Among the azo compounds available on the market, 2, 2'-azobis(isobutyronitrile) has been the only azo compound which satisfies the required level of the nonflammability.

Even in the said Japanese patent application, Kokoku 51-24302, which reveals the usage of the azo compounds in combination, 2, 2'-azobis(isobutyronitrile) was the only example listed from the azo compounds of this type and other examples presented are the azo compounds having phenyl groups and the azo compounds having oxygens. No other dialkyl azo compounds, except 2,2'-azobis(isobutyronitrile), were specifically disclosed.

Further in the case of 2,2'-azobis(isobutyronitrile), tetramethyl succinodinitrile is produced by decomposition during the vulcanization and forming process which material possesses strong toxicity. However, the said Japanese patent application Kokoku 51-24302 did not address this problem, as well.

In addition, the combined use of triazole type compounds has a bag effect on workers due to the strong odor during the vulcanization and forming process. Further these compounds interfere with vulcanization, which troublesomely impairs the hardness and modulus of the cured products.

When organic silicone compounds having nitrogens are used in combination, the resultant nonflammability tends to be inferior for some types of the silicone rubber compositions. Therefore the silicone rubber compositions useful with such compounds are limited.

Therefore it is an object the present invention to offer nonflammable silicone rubber compositions which have a superior nonflammability while reducing the toxicity of the by-products generated by the vulcanization and forming process.

Upon further study of the specification and appended claims, further objects and advantages of this invention will become apparent to those skilled in the art.

SUMMARY OF THE INVENTION

The present invention provides nonflammable silicone rubber compositions which comprise the following components (1) through (5):

(1) preferably about 100 parts by weight of organopolysiloxanes expressed by the average compositional formula $$R_m SiO_{(4-m)/2}$$

wherein R is a hydroxyl group, or a substituted or unsubstituted monovalent hydrocarbon group; and the subscript m is a positive number from preferably about 1.98 to 2.02, (2) preferably about 5 to 500 parts by weight based on 100 parts of (1) of finely powdered silica type fillers, (3) preferably about 3 to 200 ppm of platinum based on component (1), or a platinum type (i.e., platinum containing) compound having the equivalent amount of platinum, (4) 2, 2'-azobis(2-methyl butyronitrile) at a molar ratio of nitrogen-nitrogen double bonds to platinum in the component (3) of preferably about 2 to 200, and (5) at least one metal element or metal compound (A), (B) and/or (C) below:

(A) preferably about 10 to 20,000 ppm of cerium based on component (1), or a cerium type (i.e., -containing) compound having the equivalent amount of cerium, (B) preferably about 1 to 20 weight parts of iron oxide based on component (1), and (C) preferably about 1 to 20 weight parts of titanium oxide based on component (1).

Below, the present invention is explained in detail.

The inventors of the present invention have discovered that the decomposition products from 2, 2'-azobis(2-methyl butyronitrile) possess much less toxicity than those from 2, 2'-azobis(isobutyronitrile), resulting in reduced toxicity due to by-products formed during vulcanization and forming processes. Further, they also discovered that the use of platinum containing compounds in combination with 2, 2'-azobis(2-methyl butyronitrile) and a metal element, or metal compound, leads to the superior nonflammability.

Component (1) of the present invention, the organopolysiloxane, is expressed by the average compositional formula $$R_m SiO_{(4-m)/2}$$

wherein R is a hydroxyl group, or a substituted or unsubstituted monovalent hydrocarbon group; and the subscript m is a positive number from preferably about 1.98 to 2.02. Preferably, the hydrocarbon group R has 1–20, more preferably 1–8 carbon atoms.

Examples of the substituted or unsubstituted monovalent hydrocarbon group are: alkyl groups such as a methyl group, an ethyl group, a propyl group, and a butyl group; alkenyl groups such as a vinyl group, an allyl group, and a butenyl group; aryl groups such as a phenyl group, and a tolyl group; and the above groups in which a part of, or all of, the hydrogen atoms bound to carbon atoms are substituted with halogen atoms or a cyano group such as a chloromethyl group, a chloropropyl group, a 3, 3, 3-trifluoropropyl group, and a 2-cyanoethyl group. These R groups may be the same or different.

The said organopolysiloxanes are preferably those of which both terminals are blocked, i.e., end-blocked, with triorganosilyl groups such as a trimethyl silyl group, a dimethyl vinyl silyl group, a trivinyl silyl group, and/or a methyl phenyl vinyl silyl group, or with hydroxyl groups. In order to maintain the strength of the silicone rubbers obtained by curing the compositions, the organopolysiloxanes preferably possess a viscosity of at least about 100,000 CS, more desirably from about 100,000 to about 10,000,000 CS.

Further the organopolysiloxanes desirably contain alkenyl groups at the ratio of about 0.0001 to about 5 mol %, more specifically 0.001 to 0.5 mol %.

Generally, the component (2) of the present invention, finely powdered silica type fillers, desirably possesses a specific surface area of at least about 50 m$^2$/g, more preferably from about 100 to 400 m$^2$/g. Such silica type fillers are, for example, fumed silica, sintered silica, and precipitated silica. They may be employed singly or in combination of two or more types. Further, the surface of these silica type fillers may be modified by, for example, straight or branched chain organopolysiloxanes, cyclic organopolysiloxanes, organo-chlorosilanes, and/or hexamethyl disilazanes.

The desirable amount of the component (2) is from about 5 to 500 parts by weight, more preferably from about 10 to 50 parts by weight, based on 100 parts by weight of the organopolysiloxanes, the component (1). Either more or less than this amount may impair the processability of the obtained silicone rubber compositions. In addition, the cured products obtained from the silicone rubbers may not possess sufficient mechanical strength such as tensile strength and tearing strength.

As the component (3) of the present invention, the platinum type compounds which have been already known may be utilized. Examples are platinum metal, platinum compounds, platinum complexes, chloroplatinic acid, and complexes of chloroplatinic acid with alcohols, aldehydes, ethers, and various olefins.

The desirable amount of the component (3) provides preferably about 3 to 200 ppm of platinum based on (1), and may be an amount of platinum type compounds having the equivalent amount of platinum.

The component (4) of the present invention, 2,2'-azobis(2-methyl butyronitrile), greatly improves the nonflammability from the platinum type compounds and cerium type compounds in combination. The only azo compound which has been practically employed so far is 2,2'-azobis(isobutyronitrile), which decomposes at the vulcanization and forming process to mainly tetramethyl succinodinitrile, which exhibits LD$_{50}$ (oral-rat) toxicity of 38.9. On the other hand, the decomposition product from 2, 2'-azobis(2-methyl butyronitrile) is diethyl dimethyl succinodinitrile, of which the LD$_{50}$ is 1,316. The latter's toxicity is greatly reduced, as indicated by the difference in LD$_{50}$ values of two orders of magnitude. As a result, the toxicity of vapors generated during the vulcanization and forming process or in secondary vulcanization processes is greatly reduced.

The amount of the component (4) is such that it can provide preferably about 2 to 200 nitrogen-nitrogen double bonds with respect to the molar amount of the platinum in the composition (3). This means that the molar ratio of —N=N—/Pt is preferably about 2 to 200. Less than this amount may not result in the desired nonflammability. On the other hand, excess amount may cause the problem of foaming in the vulcanization and forming process, as well as insufficient nonflammability.

The component (5) of the present invention is a metal element or metal compound, which will greatly improve the nonflammability, in combination with the platinum type compounds and 2, 2'-azobis(2-methyl butyronitrile). In particular, a metal element and the metal compounds below may be used. Among them, solid types are preferably in the form of fine particles with a particle size of preferably at most about 50 μm, in order to make their dispersion into silicone rubber easy and to maintain the mechanical strength. They may be used alone or by combining two or more types.

Examples of cerium type compounds 5(A) are cerium metal, inorganic compounds such as cerium oxide and cerium carbonate, and organic compounds such as cerium acetate, cerium octanoate, and cerium containing heterosiloxane. They may be supplied as a mixture with the compounds of other elements such as titanium, aluminum, and rare earth elements. The amount added preferably contains about 10 to 20,000 ppm of cerium based on (1) or an amount of cerium type compounds having the equivalent amount of cerium.

Examples of iron oxide compounds 5(B) are Fe$_2$O$_3$ which is usually called red oxide, Fe$_3$O$_4$ which is usually called black oxide, and these oxides where a portion of the iron atoms are substituted by other metals such as zinc and magnesium. The amount is preferably about 1 to 20 weight parts based on the organopolysiloxanes of the composition (1).

Examples of titanium oxide compounds 5(C) are rutile type TiO$_2$, anatase type TiO$_2$, and fumed TiO$_2$ prepared by the hydrolysis of titanium tetrachloride. The amount is preferably about 1 to 20 parts by weight based on the organopolysiloxanes of the composition (1).

Besides the components described above, the silicone rubber compositions of the present invention may comprise additives which are commonly added to the silicone rubber compositions as appropriate to their use. These additives are: dispersion aids such as low molecular weight siloxanes, e.g., with a polymerization degree of at most about 100, silanes having silanol groups, and silanes having alkoxyl groups; heat resistance enhancers such as iron octanoate, zinc oxide, zinc carbonate, and manganese carbonate; pigments for coloring such as carbon black and ultramarine blue; and mold releasing agents.

The silicone rubber compositions obtained above may be formed into the desired shapes such as pipes, sheets, and profile extrusion products, by general rubber forming techniques such as compression molding, transfer molding, injection molding, extrusion molding, and a calendar molding method. Then, these are vulcanized and cured by following the usual method to produce rubber products.

For the vulcanization, the conventionally known curing catalysts, such as organic peroxides, may be utilized. These include benzoyl peroxide, monochlorobenzoyl peroxide, ter-butyl perbenzoate, 2, 4-dichlorobenzoyl peroxide, di-ter-butyl peroxide, dicumyl peroxide, 1, 1-bis(ter-butyl peroxy) 3, 3, 5-trimethyl cyclohexane, 2, 5-dimethyl-2, 5-di(ter-butyl peroxy) hexane, and 2, 5-dimethyl-2, 5-di(ter-butyl peroxy) hexene. These may be used alone or by combining two or more types. The desirable amount is about 0.1 to 5 parts based on 100 weight parts of the silicone rubber compositions.

Further, when the organopolysiloxanes of component (1) possess at least two alkenyl groups, organohydrogen polysiloxanes having at least about 2 hydrogen atoms bound to silicon atoms may be used as a cross-linking agent to perform the known addition vulcanization. In this case, the ratio of hydrogen atoms bound to silicon atoms and alkenyl groups is desirably from about 0.5 to 5.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding Japanese Application No. 6-257389, filed Sep. 27, 1994, are hereby incorporated by reference.

EXAMPLES

Raw materials used in the Examples and Comparison examples are as below:

Organopolysiloxane: 99.875 mol % of $(CH_3)_2SiO$ units and 0.125 mol % of $(CH_2=CH)(CH_3)SiO$ units, both of the molecular terminals being blocked by dimethyl vinyl silyl groups. Viscosity is 10,000,000 CS.

Fumed silica: manufactured by Japan Aerosil Co. Ltd., with the trade name of "Aerosil 200" having a surface area of 200 $m^2/g$.

Diphenyl silanediol: $Ph_2Si(OH)_2$

Crystalline silica: manufactured by Tatsumori Co. Ltd., with the trade name of "Crystallite VXS".

2% chloroplatinic acid solution: alcohol solution of chloroplatinic acid substituted by dimethyl vinyl polysiloxane having a low polymerization degree (0.7 mol % vinyl)-contains 2 wt % platinum atom.

Cerium oxide: $CeO_2$

Cerium octanoate: $(C_7H_{15}COO)_4Ce$ $Fe_3O_4$: manufactured by Toda Kogyo Co. Ltd., with the trade name of "Bengara KN-320".

$Fe_2O_3$: manufactured by Toda Kogyo Co. Ltd., with the trade name of "Bengara SR-570".

Fumed $TiO_2$: manufactured by Japan Aerosil Co: Ltd., with the trade name of "Titanium Oxide P-25".

$TiO_2$ (Anatase type): manufactured by Ishihara Sangyo Co. Ltd., with the trade name of "Titanium Oxide A-100".

Benzotriazole: $C_6H_4N_3H$ 2, 2'-azobis (2-methyl butyronitrile): NC $(CH_3)(C_2H_5)$ CN=NC $(CH_3)(C_2H_5)$ CN

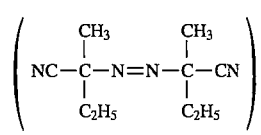

2, 2'-azobis(isobutyronitrile): NC $(CH_3)_2$ CN=NC $(CH_3)_2$ CN

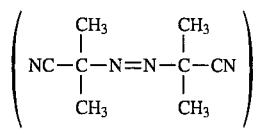

Dicumyl peroxide: PhC $(CH_3)_2$ OOC $(CH_3)_2$ Ph

Synthesis of the silicon composition A 100 parts of organopolysiloxane, 40 parts of fumed silica, and 5 parts of diphenyl silanediol as a dispersion agent are mixed uniformly. After the heat treatment at 150° C. for four hours, the mixture is peptized and plasticized by two rollers, then 60 parts of crystalline silica are further mixed by two rollers to prepare the silicone rubber composition A.

Examples 1 through 7 and Comparison Examples 1 through 6

To the said silicone rubber composition A, 2% chloroplatinic acid solution, metal compounds, benzotriazole, 2, 2'-azobis(2-methyl butyronitrile), 2, 2'-azobis (iso-butyronitrile), 2, 2'-azobis (2-dimethyl valeronitrile), NC— $(CH_3)$ $((CH_3)CHCH_2)$ CN=NC $(CH_3)$ $(CH_2CH(CH_3)_2)$ CN are mixed in by two rollers at the amount listed in. Tables 1 and 2. Then, 0.6 part of dicumyl peroxide was added to the 100 parts of these mixtures by two rollers and eight kinds of compositions are obtained. By using these compositions, a 1 mm thick sheet is prepared after pressurized molding at 165° C. for 10 minutes and the post-cure at 200° C. for 4 hours. These sheets are tested for their nonflammability by the vertical combustion test methods, described in the UL-94 for the material classes of V-0, V-1, and V-2 s. The results are shown in Tables 1 and 2.

The silicone rubber compositions, obtained by the vulcanization of the silicone rubber compositions of the present invention, exhibit the same or better nonflammable performance than those containing the platinum compounds and benzotriazole as a triazole compound, and those containing the platinum compounds and 2, 2'-azobis(isobutyronitrile) as a azo compound. In addition, it is also confirmed that the toxicity of their by-products generated during the vulcanization and forming process is greatly reduced.

TABLE 1

|  | Examples | | | | | | |
|---|---|---|---|---|---|---|---|
|  | 1 | 2 | 3 | 4 | 5 | 6 | 7 |
| Silicone rubber composition A | 100 | 100 | 100 | 100 | 100 | 100 | 100 |
| Chloroplatinic acid solution (2%) | 0.1 | 0.1 | 0.1 | 0.1 | 0.1 | 0.1 | 0.1 |
| Cerium oxide | 0.5 | 0.5 | — | — | — | — | — |
| Cerium octanoate | — | — | 0.5 | — | — | — | — |
| $Fe_3O_4$ | — | — | — | 10 | — | — | — |
| $Fe_2O_3$ | — | — | — | — | 10 | — | — |
| Fumed $TiO_2$ | — | — | — | — | — | 10 | — |
| $TiO_2$ (anatase type) | — | — | — | — | — | — | 10 |
| 2,2'-azobis(2-methyl butyronitrile) | 0.03 | 0.15 | 0.15 | 0.15 | 0.15 | 0.15 | 0.15 |
| 2,2'-azobis(iso-butyronitrile) | — | — | — | — | — | — | — |
| Molar ratio of —N=N—/Pt | (15) | (76) | (76) | (76) | (76) | (76) | (76) |

TABLE 1-continued

|  | Examples | | | | | | |
|---|---|---|---|---|---|---|---|
|  | 1 | 2 | 3 | 4 | 5 | 6 | 7 |
| Benzotriazole | — | — | — | — | — | — | — |
| UL-94, Vertical Combustion Test Total time for flamed combusion (sec) | 55 | 47 | 54 | 42 | 46 | 39 | 48 |
| Remarks | — | — | — | — | — | — | — |

TABLE 2

|  | Comparison Examples | | | | | |
|---|---|---|---|---|---|---|
|  | 1 | 2 | 3 | 4 | 5 | 6 |
| Silicone rubber composition A | 100 | 100 | 100 | 100 | 100 | 100 |
| Chloroplatinic acid solution (2%) | 0.1 | 0.1 | 0.1 | 0.1 | 0.1 | 0.1 |
| Cerium oxide | 0.5 | — | 0.5 | 0.5 | 0.5 | 0.5 |
| Cerium octanoate | — | — | — | — | — | — |
| $Fe_3O_4$ | — | — | — | — | — | — |
| $Fe_2O_3$ | — | — | — | — | — | — |
| Fumed $TiO_2$ | — | — | — | — | — | — |
| $TiO_2$ (anatase type) | — | — | — | — | — | — |
| 2,2'-azobis(2-methyl butyronitrile) | — | 0.15 | 0.50 | — | — | — |
| 2,2'-azobis(isobutyronitrile) | — | — | — | 0.15 | — | — |
| 2,2'-azobis(2,4-dimethyl valeronitrile) | — | — | — | — | — | 0.15 |
| Molar ratio of —N=N—/Pt | — | (76) | (254) | (89) | — | — |
| Benzotriazole | — | — | — | — | 0.05 | — |
| UL-94, Vertical Combustion Test Total time for flamed combustion (in seconds) | * | 150 | 85 | 52 | 50 | 96 |
| Remarks | — | — | ** | — | *** | — |

Notes
* Complete combustion
** Foaming during the forming process
*** Strong odor during the forming process The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A nonflammable silicone rubber composition comprising:

(1) 100 parts by weight of organopolysiloxanes of the average compositional formula $R_mSiO_{(4-m)/2}$ wherein R is a hydroxyl group, or an optionally substituted monovalent hydrocarbon group; and the subscript m is a positive number from 1.98 to 2.02, (2) 5 to 500 parts by weight based on (1), of a finely powdered silica filler, (3) 3 to 200 ppm of platinum or a platinum compound, calculated as platinum based on (1), (4) 2, 2'-azobis(2-methyl butyronitrile) at a molar ratio —N=N—/Pt in (3) of 2 to 200, and (5) a metal or metal compound which is at least one of:
   (A) 10 to 20,000 ppm of cerium based on (1) or a cerium compound having the equivalent amount of cerium,
   (B) 1 to 20 parts by weight of iron oxide based on (1), or
   (C) 1 to 20 parts by weight of titanium oxide based on (1).

2. A composition according to claim 1, wherein R is alkyl, alkenyl or aryl, each optionally substituted by halogen or cyano.

3. A composition according to claim 2, wherein R is methyl, ethyl, propyl, butyl, vinyl, allyl, butenyl, phenyl, tolyl, chloromethyl, chloropropyl, 3,3,3-trifluoropropyl or 2-cyanoethyl.

4. A composition according to claim 1, wherein the organopolysiloxane (1) is end-blocked with triorganosilyl groups or hydroxyl groups.

5. A composition according to claim 4, wherein the triorganosilyl groups are trimethyl silyl, dimethyl vinyl silyl, trivinyl silyl or methylphenyl vinyl silyl.

6. A composition according to claim 4, wherein the organopolysiloxane contains 0.0001 to 5 mol % alkenyl groups.

7. A composition according to claim 1, wherein the silica filler is at least one of fumed silica, sintered silica, or precipitated silica.

8. A composition according to claim 1, wherein the specific surface area of the silica filler is at least 50 $m^2/g$.

9. A composition according to claim 1, wherein the platinum compound is chloroplatinic acid or a complex of chloroplatinic acid with alcohol, aldehyde, ether or an olefin.

10. A composition according to claim 1, wherein the cerium compound is cerium oxide, cerium carbonate, cerium acetate, cerium octanoate or a cerium-containing heterosiloxane.

11. A composition according to claim 1, wherein the iron oxide is $Fe_2O_3$, $Fe_3O_4$, or one of these oxides in which a portion of the iron atoms is replaced by zinc or magnesium.

12. A composition according to claim 1, wherein the titanium oxide is rutile $TiO_2$, anatase $TiO_2$, or fumed $TiO_2$.

13. In a silicone rubber composition comprising an azo-containing non-flammability agent, the improvement wherein the agent comprises 2,2'-azobis(2-methyl butyronitrile).

14. A composition according to claim 13, further comprising platinum metals or a platinum compound and at least one of cerium, a cerium compound, iron oxide or titanium oxide.

15. In a process for forming a silicone rubber article, comprising shaping a silicone rubber composition, vulcanizing and curing, the improvement wherein the composition is one according to claim 1.

16. In a process for forming a silicone rubber article, comprising shaping a silicone rubber composition, vulcanizing and curing, the improvement wherein the composition is one according to claim 13.

* * * * *